(12) United States Patent
Kasperchik et al.

(10) Patent No.: US 7,892,619 B2
(45) Date of Patent: Feb. 22, 2011

(54) COATING FOR OPTICAL RECORDING

(75) Inventors: Vladek P. Kasperchik, Corvallis, OR (US); Michael J. Day, Philomath, OR (US); Jayprakash C. Bhatt, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1003 days.

(21) Appl. No.: 11/639,908

(22) Filed: Dec. 16, 2006

(65) Prior Publication Data

US 2008/0145588 A1      Jun. 19, 2008

(51) Int. Cl.
*B32B 3/02* (2006.01)

(52) U.S. Cl. .................... 428/64.1; 428/64.4; 428/64.8; 430/270.14

(58) Field of Classification Search ........................ None
See application file for complete search history.

(56) References Cited

U.S. PATENT DOCUMENTS

| | | | |
|---|---|---|---|
| 3,658,543 A | 4/1972 | Gerlach, Jr. et al. | |
| 4,097,288 A | 6/1978 | Lawton | |
| 4,343,885 A | 8/1982 | Reardon, Jr. | |
| 4,853,361 A | 8/1989 | Satake et al. | |
| 5,061,536 A * | 10/1991 | Satake et al. | 428/64.8 |
| 5,178,669 A | 1/1993 | Watanabe et al. | |
| 5,274,460 A | 12/1993 | Yamada et al. | |
| 5,434,119 A | 7/1995 | Satake et al. | |
| 5,470,816 A | 11/1995 | Satake et al. | |
| 5,543,382 A | 8/1996 | Watanabe et al. | |
| 5,646,088 A | 7/1997 | Hada et al. | |
| 5,691,757 A | 11/1997 | Hayashihara et al. | |
| 5,703,006 A | 12/1997 | Mori et al. | |
| 5,707,778 A | 1/1998 | Minami et al. | |
| 5,810,397 A | 9/1998 | Mehta et al. | |
| 5,824,715 A | 10/1998 | Hayashihara et al. | |
| 5,955,224 A | 9/1999 | Caspar et al. | |
| 6,022,648 A | 2/2000 | Jacobson et al. | |
| 6,040,108 A | 3/2000 | Schaedeli | |
| 6,075,223 A | 6/2000 | Harrison | |
| 6,251,571 B1 | 6/2001 | Dessauer et al. | |
| 6,313,436 B1 | 11/2001 | Harrison | |
| 6,329,035 B1 | 12/2001 | Iwasaki et al. | |
| 6,432,610 B1 | 8/2002 | Rentzepis et al. | |
| 6,432,876 B1 | 8/2002 | Obayashi et al. | |
| 6,702,437 B2 | 3/2004 | Fujimaki et al. | |
| 6,720,124 B2 | 4/2004 | Takashima et al. | |

(Continued)

FOREIGN PATENT DOCUMENTS

EP     0181698 A1     5/1988

(Continued)

OTHER PUBLICATIONS

International Search Report for PCT/US2007/086485, filed Dec. 5, 2007, Hewlett-Packard Development Co.; Report issued Apr. 29, 2008.

*Primary Examiner*—Elizabeth Mulvaney

(57) ABSTRACT

A coating composition for optical recording includes a uniform dispersion of polymer particles in a liquid, a quantity of dye particles uniformly dispersed in the liquid, the dye particles being soluble in the polymer but substantially insoluble in the liquid, and a quantity of radiation absorber material adapted to absorb radiation at a wavelength of a laser for optical recording of an image.

25 Claims, 1 Drawing Sheet

U.S. PATENT DOCUMENTS

| | | |
|---|---|---|
| 6,875,726 B2 | 4/2005 | Shuku et al. |
| 6,974,661 B2 | 12/2005 | Gore et al. |
| 7,060,654 B2 | 6/2006 | Kasperchik et al. |
| 7,141,360 B2 | 11/2006 | Kasperchik et al. |
| 2002/0045548 A1 | 4/2002 | Saito |
| 2002/0089580 A1 | 7/2002 | Suzuki et al. |
| 2002/0183203 A1 | 12/2002 | Hoefs et al. |
| 2003/0003399 A1 | 1/2003 | Muller et al. |
| 2003/0036478 A1 | 2/2003 | Seki et al. |
| 2003/0108708 A1 | 6/2003 | Anderson et al. |
| 2004/0043902 A1 | 3/2004 | Oda et al. |
| 2004/0146812 A1 | 7/2004 | Gore et al. |
| 2004/0147399 A1 | 7/2004 | Gore |
| 2005/0014645 A1* | 1/2005 | Shimbo et al. ............... 503/201 |
| 2005/0078324 A1 | 4/2005 | Koll et al. |
| 2005/0089782 A1 | 4/2005 | Kasperchik et al. |
| 2005/0100817 A1 | 5/2005 | Kasperchik et al. |
| 2005/0244741 A1 | 11/2005 | Kasperchik et al. |
| 2005/0277070 A1 | 12/2005 | Kasperchik et al. |
| 2006/0009356 A1 | 1/2006 | Muryama et al. |
| 2006/0068315 A1 | 3/2006 | Gore |
| 2006/0093958 A1 | 5/2006 | Kasperchik et al. |
| 2006/0147833 A1 | 7/2006 | Kasperchik et al. |
| 2008/0003396 A1* | 1/2008 | Hladik et al. ............... 428/64.4 |

FOREIGN PATENT DOCUMENTS

| | | |
|---|---|---|
| EP | 0384665 A2 | 8/1990 |
| EP | 0716135 B1 | 9/1999 |
| WO | WO 03/032299 A2 | 4/2003 |
| WO | WO 2004/067289 A1 | 8/2004 |
| WO | 2006019377 | 2/2006 |

\* cited by examiner

COATING FOR OPTICAL RECORDING

CROSS-REFERENCE TO RELATED APPLICATION

This application is related to co-pending and commonly assigned application Ser. No. 11/231,571, filed Sep. 21, 2005, the entire disclosure of which is incorporated herein by reference.

TECHNICAL FIELD

This invention relates generally to coating compositions for optical recording and related methods.

BACKGROUND

Optical recording technology that enables consumers and others to record laser-written labels on specially coated recordable CD and DVD media has enjoyed notable commercial success. In light-activated thermal label-recording technology, a surface of the medium is coated with a writable layer of a material that changes appearance when it absorbs laser light of a predetermined wavelength.

Some coating compositions for optical recording have color-forming components that include leuco-dye of a fluoran type and phenol developer or activator, both of low solubility, dispersed as separate phases in a radiation-curable polymer matrix. Typically, such formulations require imaging radiation energy density greater than 0.5-1.0 Joule/cm$^2$.

Other coating compositions for optical recording include two separate phases: (1) a polymer matrix with acidic developer (such as a phenol) dissolved in the matrix and (2) a fluoran type of leuco-dye which is not soluble or has low solubility in the first phase at ambient temperature. With such compositions, color is developed through heating of the coating with laser radiation. In order to tune (sensitize) the coating to the laser emission wavelength used and to optimize heating efficiency, such compositions may also include an "antenna dye" with a peak absorption wavelength Lambda(max) matching the laser wavelength.

Some compositions utilize a color-forming reaction between a fluoran leuco-dye and an acidic developer such as a phenol. The reaction between the fluoran leuco-dye and a phenol developer is reversible and, hence, color formation is reversible. Certain factors, such as leuco-dye crystallization from the imaged coating or increased mobility of color-forming species in the coating matrix caused by contamination (e.g., human skin oil) may cause discoloration of the image in some of these coating compositions.

Other coating compositions have a color layer and a layer of light-scattering pigment that becomes at least translucent when heated to a predetermined temperature. In order to produce a color mark, a two-layered structure is required, having a light-scattering layer and a colored undercoat. Thus, there is a need for further improvement in coating compositions and methods for marking of media.

BRIEF DESCRIPTION OF THE DRAWINGS

The features and advantages of the disclosure will readily be appreciated by persons skilled in the art from the following detailed description when read in conjunction with the drawings, wherein.

DETAILED DESCRIPTION OF EMBODIMENTS

Figure 1:
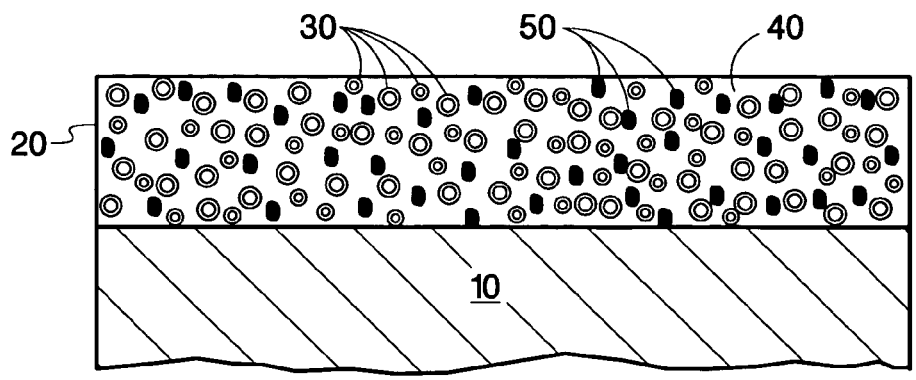
FIG. 1 is a cross-sectional side elevation view illustrating schematically an embodiment of a coating for optical recording at one stage of its formation.

For clarity of the description, the drawings are not drawn to a uniform scale. In particular, vertical and horizontal scales may differ from each other and may vary from one drawing to another. In this regard, directional terminology, such as "top," "bottom," "front," "back," "leading," "trailing," etc., may be used with reference to the orientation of the drawing figure(s) being described. Because components of the invention can be positioned in a number of different orientations, the directional terminology is used for purposes of illustration and is in no way limiting.

The terms "recordable medium" and "recordable media" as used in this specification and the appended claims refer to media capable of having information recorded thereon by exposure to optical radiation such as laser light. Such recordable media may include, for example, a compact disk (CD), a digital versatile disk (DVD), an HD-DVD, a Blu-ray Disc™ (BD), a holographic versatile disk (HVD), or a video disk, but are not limited to such forms. Recordable media may also include such media having pre-recorded information readable from at least one side and having an optically-recordable coating on at least the other side for writing a label on the media. The term "recording" means recording or printing a label or other information on a recordable medium such as an optical storage disk.

One aspect of the invention provides embodiments of a coating composition for optical recording which includes a uniform dispersion of polymer particles in a liquid, a quantity of dye particles uniformly dispersed in the liquid, the dye particles being soluble in the polymer, but substantially insoluble in the liquid, and a quantity of radiation absorber material adapted to absorb radiation at a predetermined wavelength. The predetermined wavelength of the adapted radiation absorber material is the wavelength of a laser for optical recording of an image.

The liquid may be a polar solvent, such as water. The coating composition may include a binder substance (soluble in the liquid), which may enhance the film-forming qualities of the dry coating. An example of a binder suitable for an aqueous solvent is poly(vinyl alcohol) (PVA). Optionally, the composition may also include conventional surfactants or dispersing aids to improve dispersion stability of the formulation and enhance dispersibility of particles in the liquid.

When a coating embodiment made as described herein is coated on a substrate and dried to remove the liquid, an embodiment of a recordable medium is made that may be used to record or print a label or other information.

FIG. 1 shows a cross-sectional side elevation view, schematically illustrating an embodiment of an optical recording coating at one stage of its formation. A substrate 10 is coated with a layer 20 including polymer particles 30 uniformly dispersed in liquid 40. Dye particles 50 are also uniformly dispersed in liquid 40.

Figure 2:
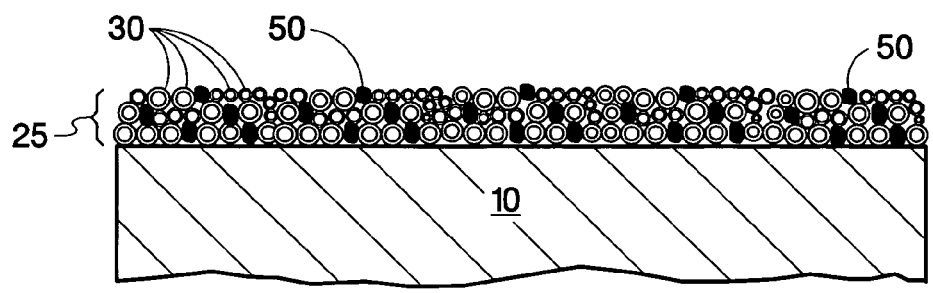
FIG. 2 is a cross-sectional side elevation view illustrating schematically an embodiment of a coating for optical recording at a later stage of its formation.

FIG. 2 shows the same embodiment after drying to substantially remove the liquid 40, forming a substantially dry film 25 with dye particles 50 uniformly dispersed among polymer particles 30.

Figure 3:
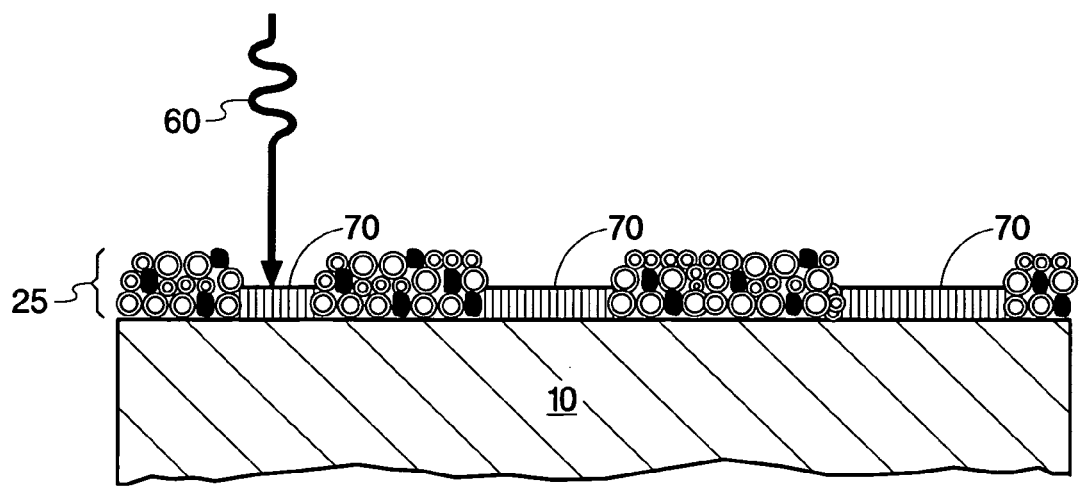
FIG. 3 is a cross-sectional side elevation view illustrating schematically effects of optical recording on an embodiment of a coating.

FIG. 3 shows the same embodiment schematically illustrating effects of optical recording on the coating. Laser beam 60 selectively exposes regions 70 in the film 25. In regions 70, the polymer particles 30 have been melted, and the dye particles 50 have been dissolved in the melted polymer. Thus, regions 70 comprise colored polymer, colored according to the characteristics of dye particles 50 (described in more detail below).

For some coating embodiments, the polymer particles 30 may be substantially insoluble in the liquid. The polymer particles may have diameters of less than about ten micrometers. The polymer particles may comprise one or more polymer materials, such as latex, acrylics, polystyrene, copolymers of these, and mixtures of these, for example. Aqueous solutions of water-soluble polymers can be used, but the base material is advantageously made as a polymer dispersion where polymer particles 30 exist as a distinct phase.

It is advantageous to use in the dispersion polymer particles 30 that are of sizes and shapes that provide strong light scattering and, hence, enable strong masking or hiding of the substrate. Light scattering by polymer particles also helps to hide coloration caused by the presence of particles of the dyes and helps to lighten background of non-imaged coating, thus improving the image contrast. The polymer particles do not necessarily need to have very uniform sizes, i.e., they do not need to be monodisperse.

For many applications, optimum base materials for the described formulations are dispersions of hollow substantially spherical polymer particles. Typical examples of hollow sphere pigments which can be used in the formulation of coating embodiments include, but are not limited to commercially available Ropaque hollow sphere pigments made by Rohm and Haas Company of Philadelphia, Pa. These pigments are hollow spherical styrene-acrylic copolymer particles typically supplied as aqueous dispersions.

It is advantageous to have insoluble polymer particles in a size range facilitating light scattering. Thus polymer particle size may be in the range between about 0.1 micrometer and about 15 micrometers. For maximum light scattering in the visible wavelength range, polymer particle size may be between about 0.5 micrometer and about 3 micrometers.

The color-forming part of the formulation may comprise plastic-soluble dyes 50 milled to a particle size from a fraction of micrometer to micrometer range (e.g., particle size 0.1-10 micrometer). The plastic-soluble dyes used in the formulation of various embodiments are selected to have substantially complete insolubility in the dispersion vehicle (e.g., water) and a melting temperature above the ambient temperature of a desired recording environment (e.g., above about 60° C.). These characteristics prevent blooming of the dye into the polymer phase and prevent premature color development in the mix or fogging of the imaged coating. Good solubility of the melted dye in the polymer particles is beneficial for good color development during marking and for stability of the laser-imaged marks.

Along with the other components, the coating composition may also comprise a quantity of radiation absorber material adapted to absorb radiation at a predetermined wavelength, i.e., the wavelength of laser radiation desired to use for optical recording. For example, such a predetermined wavelength may be between about 365 nanometers and about 1600 nanometers. Such a radiation absorber material may include one or more dyes or pigments, such as cyanine, phthalocyanine, naphthalocyanine, or combinations of such dyes or pigments. The radiation absorber material may be dissolved or uniformly dispersed in at least one of either the liquid 40 or the polymer particles 30. If the liquid is to be completely removed by drying the initial coating, for example, the radiation absorber material may be dissolved in the polymer particles 30. If the radiation absorber material particles are substantially insoluble in the liquid and/or in the polymer particles, then particles of radiation absorber material (not shown) may be uniformly dispersed in either or both of the liquid or the polymer particles.

Generally, the dye particles 50 should have a melting temperature higher than the ambient temperature of a desired recording environment. For example, the dye particles 50 may have a melting temperature above 60° C. Specifically, in some embodiments, the dye particles 50 comprise one or more anthraquinone dyes. The dye particles may include an "antenna dye."

Examples of polymer-soluble dyes 50 which can be used in the embodiments described include but are not limited to many anthraquinone dyes and other water-insoluble, plastic-soluble or solvent-soluble dyes used for coloration of industrial plastics. For example:

Sandoplast Blue 2B (1,4-Bis(2,4,6-trimethylanilino)anthraquinone with a melting temperature of about 245° C.), available from Clariant Corp. of Coventry, R.I., and Sandoplast Red PFS (1-(Methylamino)-9,10-anthraquinone with a melting temperature of about 170° C.), also available from Clariant Corp. of Coventry, R.I.

Examples of suitable radiation absorbers or "antenna dyes" for use with a 780 nanometer imaging laser include but are not limited to:

1) water-soluble cyanine dyes with extinction peaks in the near-infrared (NIR) range such as:

a) Indocyanine Green (1H-Benz[e]indolium, 2-[7-[1,1-dimethyl-3-(4-sulfobutyl)benz[e]indolin-2-ylidene]-1,3,5-heptatrienyl]-1,1-dimethyl-3-(4-sulfobutyl)-, hydroxide, inner salt, sodium salt), (NIR extinction peak at 785 nm); available as S0270 NIR dye from FEW Chemicals Gmbh of Wolfen, Germany;

b) 3H-Indolium, 2-[2-[2-chloro-3-[[1,3-dihydro-3,3-dimethyl-1-(4-sulfobutyl)-2H-indol-2-ylidene]ethylidene]-1-cyclohexen-1-yl]ethenyl]-3,3-dimethyl-1-(4-sulfobutyl)-, inner salt, sodium salt (9Cl) (NIR extinction peak at 783 nm), available as S00121 NIR dye from FEW Chemicals Gmbh of Wolfen, Germany, (also available as IR783 from Sigma-Aldrich of St. Louis, Mo.;

c) 1H-Benz[e]indolium, 2-[2-[2-chloro-3-[[1,3-dihydro-1,1-dimethyl-3-(4-sulfobutyl)-2H-benz[e]indol-2-ylidene]ethylidene]-1-cyclohexen-1-yl]ethenyl]-1,1-dimethyl-3-(4-sulfobutyl)-, inner salt, sodium salt (9Cl), (NIR extinction peak at 820 nm); available as S0306 NIR dye from FEW Chemicals Gmbh of Wolfen, Germany, (also available as IR820 from Sigma-Aldrich of St. Louis, Mo.); and 2) water-dispersible NIR pigments with extinction range between 700 and 900 nm such as YKR-5010 available from Yamamoto Chemicals, Inc. of Osaka, Japan.

EXAMPLE FORMULATIONS

Coating embodiments were made with the following two example formulations, which exhibited the respective recording characteristics noted after each formulation. The coatings in Examples 1 and 2 were applied to the surface of an optical disk (CD) as fluids by means of spin-coating at 5,000 rpm for 15 sec. The coating layer was dry by the end of spinning. The thickness of the layer after the drying was in the range of 3 to 5 micrometers.

EXAMPLE 1

Ropaque HP-1055 (26.5% solids in aqueous dispersion) 97.39%

HS330 Sandoplast Red PFS (1-3 micrometer) 1.36%
Triton X-100 1%
Indocyanine Green 0.25%
Imaged with a 780 nm laser (power=38 milliwatts and fluence ~0.5 Joule/cm$^2$)
Recording characteristics: Light pink background and red marks.

EXAMPLE 2

Ropaque HP-1055 (26.5% solids in aqueous dispersion) 97.19%
HS510 Sandoplast Blue 2B (1-3 micrometer) 1.36%
Triton X-100 1%
YKR-5010 pigment 0.45%
Imaged with 780 nm laser (Power=38 milliwatts and fluence ~0.5 Joule/cm$^2$).
Recording characteristics: Light grey background and blue/violet marks.

Another aspect of the invention is a method of preparing an optical-recording-medium layer on a substrate, including steps of coating the substrate with a layer comprising the coating composition described above and substantially removing the liquid by drying the coated layer at a temperature less than the melting temperature of the dye particles. The substrate may be a substantially planar one. Specifically, the substrate itself may be an optical storage medium, such as an optical storage disk, a compact disk (CD), a digital versatile disk (DVD), an HD-DVD, a Blu-ray Disc™ (BD), a holographic versatile disk (HVD), or a video disk. For example, the coating embodiment as described may be coated on one side of the optical storage disk for printing label information while the other side carries the actual content, such as data, music, video, etc.

Coating of the substrate may be done by any of a number of known coating methods, such as spraying, screen-printing, spin-coating, gravure printing, etc. The thickness of the coating is generally not critical, but should be uniform and sufficiently thick to have a uniform appearance before recording. Typical thicknesses of the coating may be about 5-30 micrometers as applied and about 2-25 micrometers after drying, for example.

Thus, another aspect of the invention is an embodiment of an optical storage medium comprising a substantially planar substrate and a recording layer formed by a method as described above. Specifically, such an optical storage medium embodiment may include (a) a substantially planar substrate, and (b) a recording layer formed by coating the substrate with a uniform dispersion of polymer particles in a liquid, a quantity of dye particles uniformly dispersed in the liquid, the dye particles being soluble in the polymer but substantially insoluble in the liquid, and (optionally) a binder uniformly dispersed in the liquid. The recording layer may be further formed by drying the coated layer at a temperature less than the melting temperature of the dye particles.

Embodiments of such an optical storage medium may also comprise a quantity of radiation absorber material, such as an "antenna dye," adapted to absorb radiation at a predetermined wavelength, the radiation absorber material being dissolved or uniformly dispersed in the recording layer.

Embodiments of optical recording coating made as described herein have very good image permanence. Dissolution of polymer-plastic-soluble dyes in the molten or fused polymer particles is irreversible. Moderate heating of the imaged coating to temperatures below melting temperature of polymer and plastic-soluble dye will not result in partial color development or image fogging. Moderate heating of the imaged area is unlikely to cause precipitation of plastic-soluble dye from its solution in fused polymer.

The formulation design, its preparation, and its application are all simple. The coating may be applied in a single layer. It does not require a color undercoat to produce colored markings. The color of markings is primarily defined by the color or colors of the plastic-soluble dye present in the coating. The coating preparation is very simple; it can be reduced to one step: dispersion of plastic-soluble dye particles in an aqueous dispersion of polymer. The coating may be made to be curable with ultraviolet (UV) light. Optional radiation absorber material (antenna dye or pigment) is uniformly dissolved and/or dispersed in the mixture.

Another aspect of the invention provides embodiments of an article of manufacture for use in a recording environment having an ambient temperature. The article includes a substrate coated with a recording layer. As in other embodiments described above, the substrate may be a substantially planar optical storage medium, such as an optical storage disk, a compact disk (CD), a digital versatile disk (DVD), an HD-DVD, a Blu-ray Disc™ (BD), a holographic versatile disk (HVD), or a video disk, for example. The recording layer comprises a quantity of polymer particles, a quantity of radiation absorber material adapted to absorb radiation at a predetermined wavelength of a laser for optical recording of an image (the radiation absorber material being dissolved or uniformly dispersed in the polymer particles), and a quantity of dye particles having a melting temperature higher than the ambient temperature of the recording environment (the dye particles being soluble in the polymer particles but not dissolved in the polymer particles prior to optical recording of an image). Dissolution of the dye particles in the polymer occurs during optical recording by selective illumination of the article with a laser of the predetermined wavelength. As described above, the polymer particles may comprise one or more polymer materials selected from latex, acrylics, polystyrene, copolymers thereof, and mixtures thereof, for example. The dye particles may comprise one or more dye substances selected from anthraquinone dyes, for example.

INDUSTRIAL APPLICABILITY

Coating and optical recording media made in accordance with the invention are especially useful in recording or printing a label or other information on a recordable medium such as optical storage disks. The coatings may also be used in other optical recording and optical printing applications.

Although the foregoing has been a description and illustration of specific embodiments of the invention, various modifications and changes thereto can be made by persons skilled in the art without departing from the scope and spirit of the invention as defined by the following claims. For example, coating embodiments having dyes for various colors may be selectively coated on various distinct portions of a substrate to form multi-color labels. Functionally equivalent materials may be substituted for specific materials described.

What is claimed is:
1. A coating composition for optical recording of an image, the composition comprising:
   a) a uniform dispersion of polymer particles in a liquid, said polymer particles having a melting temperature lower than an ambient temperature of optical recording;
   b) a quantity of dye particles uniformly dispersed in the liquid, the dye particles being soluble in the polymer but not dissolved in the polymer particles prior to optical recording, substantially insoluble in the liquid, and hav- ing a melting temperature higher than said ambient temperature of optical recording; and c) a quantity of radiation absorber material adapted to absorb radiation at a predetermined wavelength, wherein the predetermined wavelength of the adapted radiation absorber material is the wavelength of a laser for optical recording of an image, the radiation absorber material being dissolved or uniformly dispersed in the polymer particles.

2. The coating composition of claim 1, wherein the liquid is a polar solvent.

3. The coating composition of claim 1, wherein the liquid is water.

4. The coating composition of claim 1, wherein the polymer particles are substantially insoluble in the liquid.

5. The coating composition of claim 1, wherein the polymer particles comprise one or more polymer materials selected from latex, acrylics, polystyrene, copolymers thereof, and mixtures thereof.

6. The coating composition of claim 1, wherein the polymer particles are hollow substantially spherical particles.

7. The coating composition of claim 1, wherein the polymer particles have diameters of less than about ten micrometers.

8. The coating composition of claim 1, wherein the predetermined wavelength is between about 365 nanometers and about 1600 nanometers.

9. The coating composition of claim 1, wherein the radiation absorber material comprises one or more dyes or one or more pigments, the dyes or pigments comprising one or more of cyanine, phthalocyanine, naphthalocyanine, or combinations thereof.

10. The coating composition of claim 1, wherein the radiation absorber material is dissolved in at least one of the liquid or the polymer particles.

11. The coating composition of claim 1, wherein the radiation absorber material comprises particles substantially insoluble in the liquid and/or in the polymer particles, the particles of radiation absorber material being uniformly dispersed in at least one of the liquid or the polymer particles.

12. The coating composition of claim 1, wherein the dye particles have a melting temperature higher than the ambient temperature of a desired recording environment.

13. The coating composition of claim 1, wherein the dye particles comprise one or more dye substances selected from anthraquinone dyes.

14. The coating composition of claim 1, further comprising a binder substance soluble in the liquid.

15. The coating composition of claim 14, wherein the binder substance comprises polyvinyl alcohol (PVA).

16. The coating composition of claim 1, further comprising a surfactant effective to aid suspension of constituents and/or to aid spreading of the coating.

17. A method of preparing an optical-recording-medium layer on a substrate, comprising the steps of:
a) coating the substrate with a layer comprising the coating composition of claim 1, and
b) substantially removing the liquid by drying the coated layer at a temperature less than the melting temperature of the dye particles.

18. The method of claim 17, wherein the substrate comprises an optical storage medium.

19. The method of claim 18, wherein the substrate comprises an optical storage disk.

20. An optical storage medium, comprising:
a) a substantially planar substrate, and
b) a recording layer formed by the method of claim 17.

21. An optical storage medium, comprising:
a) a substantially planar substrate, and
b) a recording layer formed by coating the substrate with:
  i) a uniform dispersion of polymer particles in a liquid, said polymer particles having a melting temperature lower than an ambient temperature of optical recording for said optical storage medium;
  ii) a quantity of dye particles uniformly dispersed in the liquid, the dye particles being soluble in the polymer but not dissolved in the polymer particles prior to optical recording, substantially insoluble in the liquid, and having a melting temperature higher than said ambient temperature of optical recording;
  iii) a quantity of radiation absorber material adapted to absorb radiation at a predetermined wavelength, wherein the predetermined wavelength of the adapted radiation absorber material is the wavelength of a laser for optical recording of an image, the radiation absorber material being dissolved or uniformly dispersed in the polymer particles;
  iv) a binder uniformly dispersed in the liquid, and
the recording layer being further formed by drying the coated layer at a temperature less than the melting temperature of the dye particles.

22. The optical storage medium of claim 21, further comprising a quantity of radiation absorber material adapted to absorb radiation at a predetermined wavelength, the radiation absorber material being dissolved or uniformly dispersed in the recording layer.

23. An article of manufacture for use in a recording environment having an ambient temperature, comprising:
a substrate coated with a recording layer, the recording layer comprising:
a) a quantity of polymer particles, said polymer particles comprising a melting temperature lower than the ambient temperature of the recording environment;
b) a quantity of radiation absorber material adapted to absorb radiation at a predetermined wavelength of a laser for optical recording of an image, the radiation absorber material being dissolved or uniformly dispersed in the polymer particles, and
c) a quantity of dye particles having a melting temperature higher than the ambient temperature of the recording environment, the dye particles being soluble in the polymer particles but not dissolved in the polymer particles prior to optical recording of an image.

24. The article of manufacture of claim 23, wherein the polymer particles comprise one or more polymer materials selected from latex, acrylics, polystyrene, copolymers thereof, and mixtures thereof.

25. The article of manufacture of claim 23, wherein the dye particles comprise one or more dye substances selected from anthraquinone dyes.

* * * * *